May 13, 1952 H. J. IDE 2,596,928
SAFETY DEVICE
Filed Sept. 19, 1947 2 SHEETS—SHEET 1
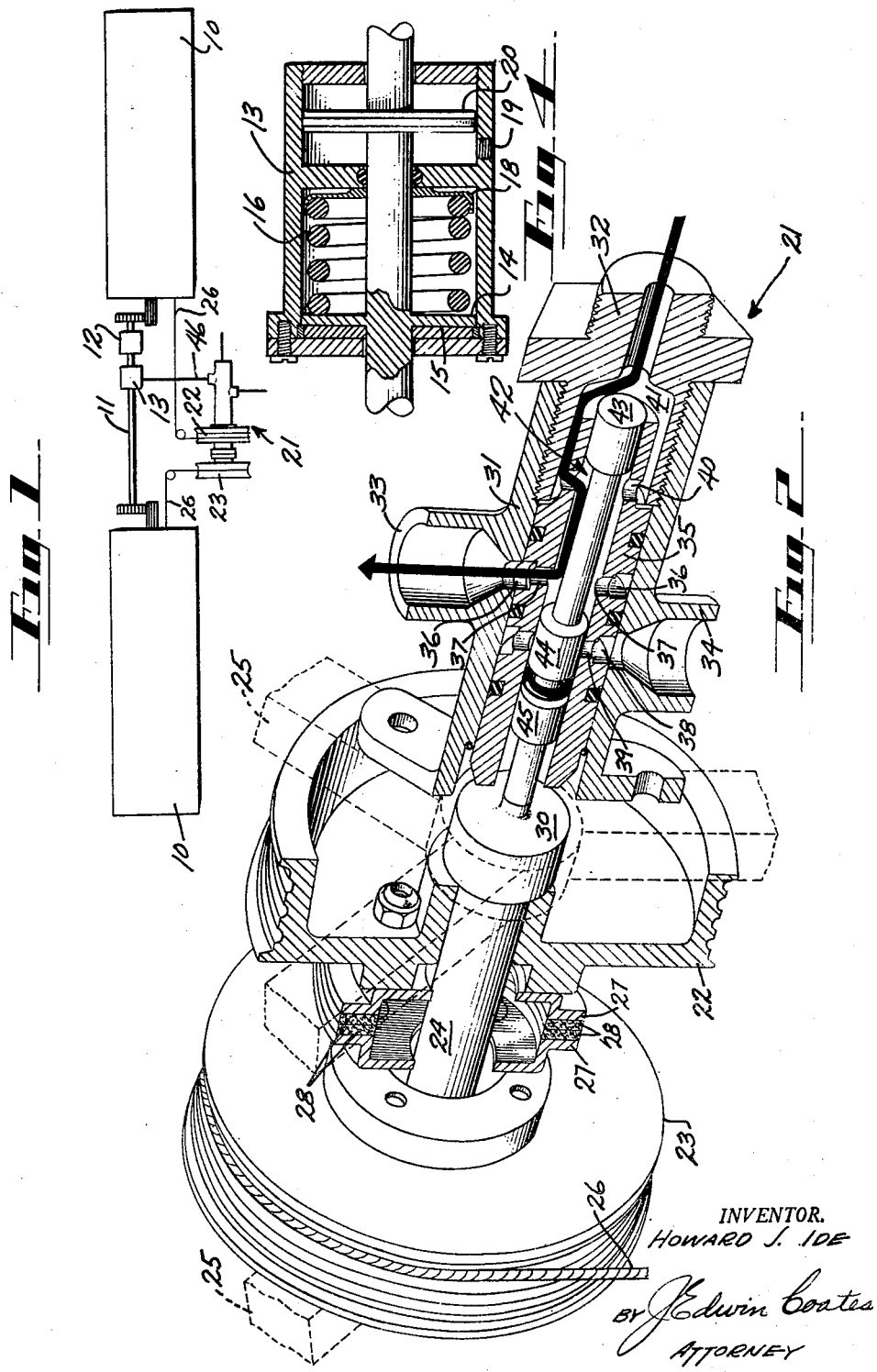
INVENTOR.
HOWARD J. IDE
BY Edwin Coates
ATTORNEY

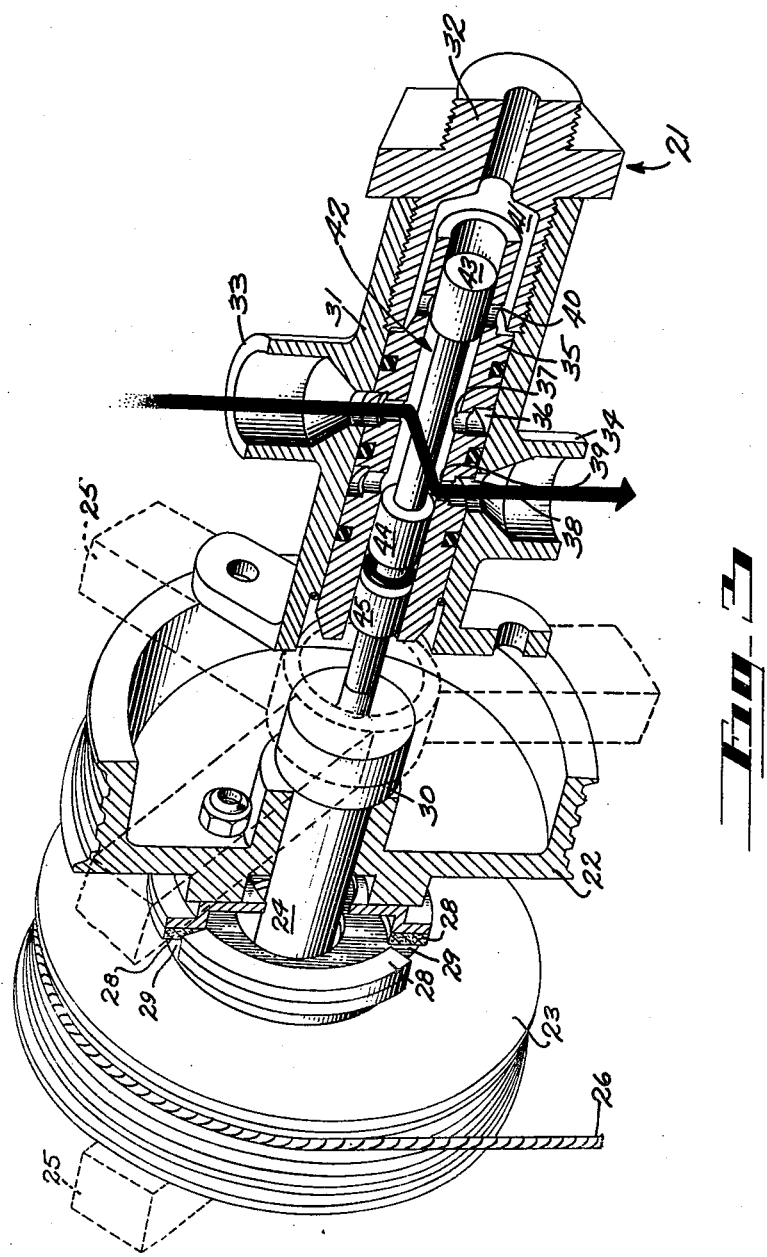

Patented May 13, 1952

2,596,928

UNITED STATES PATENT OFFICE 2,596,928

SAFETY DEVICE

Howard J. Ide, Santa Monica, Calif., assignor to Douglas Aircraft Company, Inc., Santa Monica, Calif.

Application September 19, 1947, Serial No. 775,010

18 Claims. (Cl. 192—116.5)

This invention relates to automatic controlling or triggering devices and particularly concerns those for triggering fluid-pressure responsive mechanisms, such as brakes, boosters, or the like.

Although the present invention is especially well suited for controlling such devices as spring-powered, fluid actuated disc brakes for braking the driving motors of aircraft flaps and thereby immobilizing the flaps in position upon desynchronization thereof, the concepts are by no means limited to such field of employment. For, as will hereinafter become apparent, the invention may be utilized for this brake-triggering purpose in any environment where a plurality of objects which must move in synchronism have a tendency to desynchronize, the only requisite being that the objects be provided with fluid actuated means for either braking or boosting the objects' motion and that these means be such as can be controlled by fluid-flow.

Aircraft flaps are required to move and lie substantially in co-planarity, for, differential flap movement or non-co-planarity thereof would set up differential lifts on the respective wing halves. These differential lifts would produce lateral or rolling moments that would cause the craft to side slip or to yaw, in either event endangering the craft.

Heretofore, this contingency has been provided for by incorporating in the flap operating system, means for effecting differential control or the operating fluid pressure to each flap, in an attempt to rectify the discrepancy in angular velocity of the flaps when the flaps desynchronize, so that the angular differential of the flaps will theoretically not increase to a harmful degree.

The present invention provides a device for triggering flap brakes, and thus locking the flaps, which obviates substantially all the defects of prior expedients. Being operated by fluid means employing relatively high pressures, it involves no time lag and is effected substantially instantaneously. Since it is devoid of linkages, it eliminates all possibility of link-jamming or binding. The triggering device is relatively light yet powerful and hence can be utilized in many different environments. It is also simple and compact and, as it incorporates relatively few moving parts, it is durable and dependable and easy to service.

In one of its embodiments, the device includes a pair of pulleys spacedly and slidably mounted on a shaft carried on a bracket fixed near the flap motor. Each pulley bears a flap follow-back cable leading therefrom to a flap. The adjacent faces of the pulleys are provided with annular flanges formed with alternate lugs and sockets. The shaft is headed and is longitudinally slidably mounted coaxially of the pulleys, with the inner face of its head adjacent the exterior face of the inner pulley, the outer face of its head lying adjacent the inner end of a piston valve slidably mounted coaxially therewith in a casing extending laterally from and carried by the bracket. The casing has a pressure-fluid inlet disposed at the outer end of the valve, a combined outlet-inlet port connected to the flap brake disposed intermiedate the casing ends, and a fluid outlet for exhausting fluid from the flap brake disposed substantially opposite the first mentioned outlet. The outer end of the valve piston is thus continuously fluid loaded. The brake is of the type that includes a spring loaded and headed plunger connected to the flap motor and a fluid-actuatable piston disposed in another chamber and flow-and-return connected to the aforementioned fluid outlet in the laterally extending casing so as to normally overcome the spring and maintain the brake deactuated, or cocked.

As long as the flaps move in synchronism, the lugs contact each other facewise and the head of the plunger is held against the adjacent face of the pulley by the pressure of the fluid on the valve piston, thus positively and forcefully maintaining the lugs in the aforesaid facewise engagement. In this condition of the apparatus, the piston valve occupies a position in the casing such that there is a continuous pressure fluid path through the casing to the flap brake so that fluid under pressure is continuously applied to maintain the brake inoperative.

If either of the flaps lags or stops, however, the continued movement of the unchecked flap will effect differential angular movement of the pulleys, causing the lugs of one pulley to move off the lugs of the other and into the circumferentially adjacent sockets. Thereupon, the fluid pressure acting on the outer end of the valve piston urges the inner pulley towards the other one, thus tightly interfitting and circumferentially interengaging the lugs and sockets on the pulley flanges. This movement of the one pulley permits the piston valve to move axially inwardly to a position in which it concurrently closes the aforesaid inlet port and opens the mentioned exhaust port. Pressure fluid is thus allowed to exhaust from the brake. Since the brake herein employed for the flaps is of the type that is held in inoperative position by the applied fluid pressure as long as fluid passes from the piston valve to the spring-overcoming piston-head of the brake, this pressure-release, or exhausting, instantaneously effects application of the brake. Brake application immediately immobilizes the flap operating motor, resulting in instantly locking both the flaps in the exact relative positions with reference to each other, and in the spatial positions referred to the wing, which they occupied at the time of the flap desynchronization. Thus, the destabilizing effects of the desynchronized flaps are prevented from increasing, and are restricted to values that can be neutralized by operation of the control surfaces.

While the aforedescribed construction is that which is at present preferred, it is to be understood that the invention is quite susceptible of embodiment in any structural form lying within the scope of the annexed claims. With this understanding in view, and by way of exemplification only, the aforementioned embodiment is shown in the accompanying drawings and described in detail hereinafter with reference thereto.

In these drawings:

Figure 1 is a diagrammatic view of a flap-locking system incorporating the present triggering device;

Figure 2 is an enlarged, perspective view of the device partly in longitudinal section, with the parts thereof in their brake-cocking attitude;

Figure 3 is a similar view thereof with the parts thereof in their brake-firing position, and Figure 4 is a longitudinal section of a form of braking device which may be employed in the invention.

In Figure 1 the invention is illustrated as incorporated in a flap system comprising flaps 10 shown mounted, by way of example, on a torque tube 11, adapted to be rotated by a flap motor 12 having a shaft, which may be either an integral portion of the torque tube 11 or separate therefrom and suitably connected thereto. To this shaft is connected a brake 13 for braking and stopping the motor on occasion. The brake 13 may be any type of brake desired but to illustrate the invention, a disc-type brake has been schematically shown in Figure 4 as including an applicator disc 14 fixed to the shaft and another disc 15 loosely carried by the inner surface of the brake-housing, as by splining, and adapted to be forced against the first said disc by a spring 16, the outer end of which is carried in a cup 18, in order to immobilize the shaft when the spring is freed. The spring is adapted to be normally held compressed in an inactive, or "cocked," position by means of pressure fluid, which, as later described, is adapted to be applied through a port 19 to a piston 20 carried on the shaft in a separate chamber adjacent the outer end of the spring. When the fluid pressure is removed from the piston, the spring is freed to urge the disc 14 against the disc 15, which stops the motor and immobilizes the flaps.

Fluid flow to and from each brake is triggered by a single triggering device, generally designated by the numeral 21. The triggering device includes a pair of laterally spaced pulleys 22 and 23 each mounted on a shaft 24, the shaft being carried by a bracket 25 mounted on wing structure adjacent the flap brake. Each pulley is helically grooved on its rim and each groove bears a continuous flap follow-back cable 26, each cable leading to an anchorage therefor on a flap. Each of the adjacent faces of the pulleys bears an annular flange 27, here shown as welded to the pulley face. The confronting faces of the flanges are provided with arcuate plates circumferentially arranged and spaced to define alternating lugs 28 and sockets 29. The shaft 24, slidably mounted coaxially of the pulleys, terminates at one end in a head 30 lying contiguous to the outer face of the inner pulley 22.

Fixed at its inner end to the bracket is an elongate cylindrical shell or casing 31 closed at its opposite end by means of a centrally apertured, flanged nipple 32. Integral with the longitudinal median portion of the upper periphery of the casing is a bossed aperture 33 capable of functioning both as an outlet port and as an inlet port. Integral with the lower periphery of the casing, but displaced somewhat closer to the inner end of the casing, is another bossed aperture 34 functioning only as an outlet, or bleeder, port. A packed valve sleeve 35 is fixedly mounted coaxially in the casing and bears a circumferentially extending groove 36 registering, at a location on its upper periphery, with the aperture 33. The wall of the groove is provided with a plurality of cylindrical ports 37 which open at their inner ends into the hollow interior of the sleeve. Longitudinally spaced inwardly of the length of the sleeve from this groove is another similar groove 38, a location on the lower periphery of which registers with the aperture 34. The wall of this groove is provided with ports 39 similar to the ports 37.

The outer end of sleeve 35 is radially spaced from the interior wall of the nipple 32 and is provided with a plurality of circumferentially spaced ports 40. The sleeve is longitudinally spaced from the interior wall of the outer end of the nipple to define a pressure-fluid receiving chamber 41.

Slidably mounted coaxially of the valve sleeve is a multi-headed piston valve 42 which includes three pistons 43, 44 and 45. Piston 43 normally protrudes from the outer end of the valve sleeve into the receiver chamber 41 and the inner end of the piston valve stem continuously contacts the outer face of the head 30 of the plunger. The piston 44 normally lies in longitudinally alignment and radial registry with the ports 37, thus normally preventing egress of fluid from the casing through the bleeder port. Piston 45 serves as a valve guide, or balancing means, and piston 43 now lies outwardly of the ports 40, serving as a valve guide and balancer and also closing off longitudinal passage of fluid through the sleeve 35.

The nipple 32 is in constant communication with a source of pressure-fluid, not shown, and hence, the piston 43 is continuously subjected to fluid pressure, whereby its inner end is continuously urged against the head 30 of the shaft 24, which is thereby urged against the hub of the pulley 22. As long as the flaps move in perfect synchronism, however, the piston valve is maintained in the position shown in Figure 2, for, under such circumstances, the pulleys move at the same angular velocity and the lugs of the annular flanges thereof remain in facewise contact, preventing relative axial movement of the pulleys. Thus, the piston valve then serves chiefly to hold the head 30 of the shaft 24 forcibly against the adjacent face of the pulley so as to insure that the lugs remain in facewise contact.

The pressure fluid entering the receiver chamber 41 hence flows into the annular space between the valve sleeve and the nipple, thence into the sleeve 35 through the ports 40, therefrom along the inside of the sleeve to the ports 37 and out the aperture 33 which is adapted to be connected to the port 19 by some suitable tubing 46 or the like. Pressure fluid is thereby normally applied to the spring-restraining piston 20 of the flap brake, thereby holding the spring compressed and leaving the flap motor free to rotate the flaps.

When either of the flaps lags or stops, however, the continued movement of the unchecked flap, transmitted to the concerned pulley by means of one of the cables, effects a differential in the relative angular movements of the pulleys. If this differential exceeds a predetermined value the lugs of the pulleys will no longer remain in facewise contact but instead, will mutually move into the sockets on the opposite faces, causing the pulleys to move closer together axially. Thereupon, the fluid-pressure loaded piston valve is enabled to move axially inwardly of its sleeve, or, towards the pulleys, and into the position shown in Figure 3.

In this position, the piston 43 completely prevents entry of fluid into the sleeve 35 and hence closes the fluid passageway from the pressure source to the brake, that is, this piston longitudinally registers with, and closes, all the ports 40. At the same time, this position of the valve provides a passageway, shown in Figure 3, extending from the brake to the port 33, through the casing, and to atmosphere, if the device is pneumatically operated, or to a fluid reservoir, not shown, if hydraulically operated, the piston 44 now lying inwardly in the valve sleeve out of registry with, and opening up, the ports 39. Thus, the brake piston 20 is relieved of pressure and the brake spring 16 immediately expands into active position, urging the brake discs into motor braking relationship with each other. The flaps are hence substantially instantly immobilized in the positions they occupied at the moment of their desynchronization.

The piston valve construction may be replaced by other fluid flow controlling valve means and the lugs and sockets may be replaced by other spacer or detent means, such as electromagnets constructed to repel the oppositely disposed magnets during equal rotational movements and to interfit mutually during unequal rotational movements. It is also manifest that the triggering device may be applied to other fluid controlled mechanisms than either brakes or boosters, all without departing from the scope of the present concepts.

I claim:

1. A system of the type described for arresting, upon desynchronization, the movement of movable objects normally synchronously moved by prime-mover means, comprising: a plurality of members, each rotatively connected to a corresponding movable object, and each including means operative on the similar means disposed on the other member during equiangular rotational movements thereof to space each member from the other and operative on the means located on the other member upon unequal angular movements thereof to enable juxtaposition of same; normally inactive fluid-controlled braking means connected to said prime-mover means; a pressure fluid line leading to said brake-controlling means; and fluid-flow controlling means interposed in said line and having a movable member urged by said pressure fluid against said rotary members and positioned by spaced rotation thereof so as to deactuatingly direct pressure fluid to said braking means, and positioned by juxtaposed rotation thereof so as to actuatingly direct pressure-fluid to said braking means, thereby to arrest said prime-mover means.

2. A system of the type described for arresting, upon desynchronization, the movement of movable objects normally synchronously moved by prime-mover means, comprising: a plurality of rotary members, each rotatively connected to a corresponding movable object, spacer means projecting laterally from, and circumferentially spaced on, the adjacent faces of said rotary members so as to repellingly react on the similar means similarly disposed on the other member and space each member from the other, and said means projecting from, and arranged on said faces so as to mutually accept therebetween the spacer means located on the other member upon the relative displacement of said rotary members induced by unequal angular movements thereof, thereby to enable juxtaposition of same; normally inactive braking-means, including fluid-actuatable means for controlling same, connected to said prime-mover means; a pressure-fluid line leading to said brake-controlling means; a slide-valve interposed in said line and including a casing flow-connected to said braking means and having an exhaust, the pressure in said line continuously acting against said slide valve to urge same against one of said rotary members and maintain said spacer means in repelling engagement during equiangular rotation thereof thereby to maintain said valve in a position opening said flow-connection to said brake; unequal rotation of said rotary members relatively displacing said spacer means and allowing said valve to move said rotary members and spacer-means into inter-engagement, the movement of said valve closing the fluid pressure line leading to the brake controlling means, and simultaneously opening said exhaust whereby to actuate said brake and arrest the movement of said movable objects.

3 A system of the type described for arresting, upon desynchronization, the movement of movable objects normally synchronously moved by prime-mover means, comprising: a plurality of rotary members each rotatively connected to a corresponding movable object; spacer-means projecting laterally from, and circumferentially spaced on, the adjacent faces of said rotary members so as to repellingly react on the similar means similarly disposed on the other member and space each member from the other and so as to mutually accept therebetween the spacer means located on the other member upon the relative displacement of said rotary members induced by unequal angular movements thereof, thereby to enable juxtaposition of same; fluid-controllable braking means, including actuating means therefor and control-means normally maintaining the actuating means ineffective; a longitudinally movable elongate member slidably supporting said rotary members and having a headed end abutting one of same; a pressure-fluid line leading to said control-means; fluid flow-and-return controlling means interposed in said line and including a fluid-directive movable member urged by the pressure in said line against the head of said elongate member to effect facewise contact of said spacer-means upon equiangular movements of said rotary members so as to spacedly position said rotary members and outwardly position said elongate member and said fluid-directive member so as to direct fluid to said brake-control means; unequal rotation of the rotary members relatively displacing said spacer means and allowing said fluid-directive member to move said elongate member relatively inwardly thereby to move the spacer means into inter-engagement and position said fluid-directive member relatively inwardly thereby closing the fluid pressure line leading to the brake controlling means while simultaneously opening said exhaust, whereby said actuating means will actuate said brake and arrest the movement of said movable objects.

4. A system of the type described for arresting, upon desynchronization, a plurality of movable objects normally synchronously moved by prime-mover means, including: fluid-controllable braking means connected to said prime-mover means and alternatively actuatable and deactuatable to brake and release said prime-mover means; a pressure fluid path leading to said braking means; a slide valve interposed in said path and including a primary passageway normally de-actuatingly connected to said braking means, said valve including another passageway connecting said first passageway and said brake to exhaust; an elongate member longitudinally movably supported adjacent the one end of said valve, said valve being continuously urged against said elongate member; rotary members each rotatively connected to a corresponding one of said movable objects and slidably carried by said elongate member, the rotary member adjacent said valve being abutted by the adjacent end of said elongate member; spacer means arranged circumferentially on each of the adjacent faces of the rotary members in positions to mutually react longitudinally with the corresponding spacer means on the other face during the equiangular rotation of said members thereby to maintain said elongate member and said valve in a relatively outward, primary-passageway opening position, dephasing of said rotary members effecting relative circumferential position-shifting and longitudinal interfitting of the corresponding spacer means on adjacent faces, so as to juxtapose said rotary members and position said elongate member and valve relatively inwardly of the first said position, thereby to connect the primary passageway to exhaust and effect application of said braking means so as to immobilize said movable objects.

5. A mechanism for locking normally synchronously motor-driven movable objects upon desynchronization thereof, comprising: fluid controllable braking means operatively associated with said motor means; a fixed support; a movable, headed, supporting member carried thereby; rotary members, each rotatively connected to a movable object, slidably mounted on said supporting member with the outer face of one rotary member abutted by said head; axially extending spacer members on each of the adjacent faces of said rotary members arranged on each face to mutually abut the spacer members on the other face during equiangular movements of said rotary members and longitudinally interfit with the spacer members on the other face upon unequal angular movements of said rotary members, thereby to alternatively maintain said rotary members spaced apart so as to position said head relatively outwardly of said support, and to permit said rotary members to move into adjacency so as to position said head relatively inwardly of said support; a pressure-fluid path extending to said brake; and valve means interposed in said path and including a slide valve continuously contacted at the one end by said head and, during equiangular rotation of said rotary members, positioned relatively outwardly by the outwardly positioned head so as to deactuatingly direct pressure fluid to said braking means; and said slide valve, during unequal rotation of said rotary members, being positioned relatively inwardly by the relatively inwardly positioned head to actuatingly direct pressure fluid to said braking means; whereby to normally maintain said braking means deactuated to permit free movement of said movable objects and to actuate said brake to immobilize said movable objects on occasion.

6. A mechanism for locking normally synchronously motor-driven aircraft flaps upon desynchronization thereof, comprising: fluid-controlled braking means connected to said motor means in a normally inactive condition; a bracket; a headed shaft longitudinally movably mounted therein; a plurality of pulleys, equal in number to the number of flaps, and each rotatively connected to a corresponding flap, slidably coaxially mounted on said shaft with the outer face of one of said pulleys abutted by said head; circumferentially spaced arcuate protuberances disposed on each of the adjacent faces of the pulleys with the protuberances on each face adapted to facewise-contact the protuberances on the other face during equiangular rotation of said pulleys so as to then maintain said pulleys laterally spaced and thereby position said movable shaft relatively outwardly of said bracket, said protuberances on each face being adapted to interfit with the protuberances on the other face and enable lateral movement together of said pulleys upon unequal rotational movements of said pulleys, thereby to position said shaft relatively inwardly of said bracket; a pressure-fluid path extending to said brake; and valve means interposed in said path and including a slide-valve continuously contacted at the one end by said head and normally positioned relatively outward by the outwardly positioned head so as to deactuatingly direct pressure fluid to said brake and, on desynchronization of said flaps, positioned relatively inwardly by the inwardly positioned head to actuatingly direct pressure fluid to said braking means, whereby to respectively maintain said braking means deactuated to permit said flaps to rotate freely and to actuate said braking means to immobilize said flaps upon desynchronization thereof.

7. A mechanism for locking normally synchronously motor-driven aircraft flaps upon desynchronization thereof, comprising: a fluid-controllable brake operatively associated with said motor means; a bracket; a headed shaft longitudinally movably carried thereby; a plurality of pulleys, equal in number to the flaps and each rotatively connected to a flap, slidably mounted on said shaft with the outer face of the one pulley abutted by said head; arcuate lugs disposed circumferentially on the adjacent faces of said pulleys, the lugs on each face being adapted to facewise contact the corresponding lugs on the other face during equiangular movements of said pulleys so as to maintain said pulleys laterally spaced and thereby position said head relatively outwardly of said bracket, the lugs on each face being adapted to interfit with the lugs on the other face upon unequal rotational movements of said pulleys so as to effect juxtaposing of said pulleys thereby to position said shaft relatively inwardly of said bracket; a pressure-fluid path extending to said brake; and a multi-headed, encased piston valve having the one headed end continuously loaded by said fluid and the other end continuously contacted by said shaft-head and, during equiangular rotation of said pulleys, positioned relatively outwardly of said casing by the then outwardly-positioned shaft head so as to deactuatingly direct pressure fluid to said brake, and said slide valve upon unequal rotational movements of said pulleys being positioned relatively inwardly of said casing by the inwardly positioned head so as to actuatingly direct pressure fluid to said brake; whereby to respectively maintain said brake deactuated to permit free rotation of said flaps and to actuate said brake and immobilize said flaps upon desynchronization thereof.

8. A triggering device for normally maintaining deactuated, and for automatically actuating, a fluid controlled, spring motivated force-applying mechanism of the type adapted to halt the movement of a plurality of movable objects, including: a support; a longitudinally movable headed shaft carried thereby; rotatable members equal in number to the number of movable objects supported adjacently and slidably thereon, one face of one of said members being abutted by one end of said headed shaft; a rotation-inducing connection extending from each of said movable objects to a corresponding rotatable member; detent means on the adjacent faces of the rotatable members adapted to mutually engage facewise to maintain said rotatable members laterally spaced, thereby to position said shaft relatively outwardly of said support when the object-induced angular movements of said members are in phase, and adapted to mutually engage laterally to permit said rotatable members to relatively move together, thereby to position said shaft relatively inwardly of said support, upon dephasing of said members; a pressure-fluid path extending to said force-applying mechanism to normally overcome said spring and maintain the mechanism inactive; and valve means interposed in the fluid-pressure applying path and operable by longitudinal outward positioning of said shaft so as to direct said loading fluid to said force-applying mechanism to maintain same inactive when said rotatable members are laterally spaced and operable by longitudinal inward movement of said shaft to prevent spring-overcoming flow of said loading fluid and permit exhaust thereof from said force-applying mechanism when said rotatable members are in juxtaposition, whereby to activate the force-applying mechanism and halt the movement of said movable members.

9. A triggering device for normally maintaining deactuated, and for automatically actuating, a fluid controlled, spring motivated force-applying mechanism of the type adapted to halt the movement of a plurality of movable objects, including: a support; a longitudinally movable shaft carried thereby; rotatable members supported adjacently and slidably thereon, one face of one of said members being abutted by one end of said shaft; a rotation-inducing connection extending from each movable object to a corresponding rotatable member; detent means on the adjacent faces of the rotatable members adapted to mutually engage facewise to maintain said rotatable members laterally spaced thereby to position said shaft relatively outwardly of said support when the object-induced angular movements of said members are in phase and adapted to mutually engage laterally to permit said rotatable members to relatively move together, thereby to position said shaft relatively inwardly of said support upon dephasing of said rotatable members; a pressure-fluid path extending to said force-applying mechanism and normally overcoming said spring to maintain the mechanism inactive; and a multi-headed, encased piston valve, having the one headed end continuously loaded by said controlling fluid, interposed in said path and normally maintained relatively outwardly-positioned in said casing by longitudinal outward positioning of said shaft so as to pass said loading fluid through said casing to said mechanism and maintain same inactive when said rotatable members are laterally spaced, and operable relatively inwardly of said casing by longitudinal inward movement of said shaft to obturate spring-overcoming flow of said loading fluid and permit exhaust of the controlling fluid from the spring-containing portion of said force-applying mechanism through said path and said casing when said rotatable members are in juxtaposition, thereby to actuate said brake and halt the movement of said movable members.

10. A triggering device for normally maintaining deactuated, and for automatically actuating, a fluid controlled brake of the type adapted to immobilize aircraft flaps upon desynchronization thereof, including: a support; a longitudinally movable headed shaft carried thereby; pulleys equal in number to the number of flaps supported in adjacency and coaxially thereon, one face of one of said pulleys being abutted by the headed end of said shaft; a follow-back cable extending operatively from each flap to a corresponding pulley; detent means on the adjacent faces of the pulleys adapted to normally mutually engage facewise to maintain said pulleys laterally spaced, thereby to position said shaft relatively outwardly of said support during periods of equal rotational movements of said pulleys, and said detent means being adapted to mutually engage laterally upon unequal rotational movements of said pulleys to permit said pulleys to relatively move together thereby to position said shaft relatively inwardly of said support; a pressure fluid path extending to said brake and normally overcoming said spring to maintain the brake inactive; and a multi-headed, encased piston valve having the one-headed end continuously loaded by said controlling fluid, interposed in said path and normally maintained relatively outwardly positioned in said casing by longitudinal outward positioning of said shaft so as to pass said loading fluid through said casing to said brake and maintain same inactive when said pulleys are laterally spaced, and operable relatively inwardly of said casing by longitudinal inward movement of said shaft to prevent spring-overcoming flow of said loading fluid and permit exhaust of the controlling fluid from the spring containing portion of said brake through said path and said casing when said pulleys are in juxtaposition, thereby to actuate said brake and halt the movement of said flaps.

11. A triggering device for normally maintaining deactuated, and for automatically actuating, a fluid-controlled brake of the type adapted to immobilize desynchronized aircraft flaps, including: a bracket; a longitudinally movable shaft carried thereby; pulleys equal in number to the number of flaps supported in adjacency and slidably thereon, one face of one of said pulleys being abutted by one end of said shaft; a followback cable extending from each flap to a corresponding pulley; circumferentially spaced arcuate protuberances disposed on the adjacent faces of said pulleys so as to define alternate lugs and sockets, the lugs on each face being adapted to facewise contact the lugs on the other face during equal rotational movements of said pulleys so as to then maintain said pulleys laterally spaced thereby to position said movable shaft relatively outwardly of said bracket, said lugs on each face being adapted to interfit with and circumferentially contact the lugs on the other face upon unequal rotational movements of said pulleys to permit same to move laterally together, thereby to position said shaft relatively inwardly of said bracket; and a multi-headed encased piston valve having the one headed end continuously loaded by said controlling fluid, interposed in said path and normally maintained outwardly positioned in said casing by longitudinally outward positioning of said shaft, thereby to pass said loading fluid to said brake so as to maintain same inactive during equal angular movements of said pulleys, and operable relatively inwardly of said casing by longitudinal inward movement of said shaft to obturate spring-overcoming flow of said loading fluid and concurrently permit exhaust of said controlling fluid from tthe spring containing portion of said brake when said pulleys are in jutaposition, thereby to immobilize said desynchronized flaps.

13. A fluid-flow control mechanism, including: a fluid receptacle interposed in the path of said fluid and including an inlet in the one end for continuously inletting said fluid therethrough; a combined outlet-inlet port disposed intermediate the ends of said receptacle; an outlet port in said receptacle adjacent said outlet-inlet port, a piston valve member slidably mounted coaxially of said receptacle and having a head adapted to cooperate with alternate ones of said ports to alternately direct the passage of said fluid to and from a point of application, said valve being continuously subjected at its end adjacent said inlet end to pressure from said fluid path; a shaft coaxially slidably mounted at the opposite end of said receptacle; rotary members mounted coaxially of said shaft for relative movement coaxially of each other and lying in operative juxtaposition to the opposite end of said receptacle and separately connected to rotation imparting sources; a head on the end of said shaft adjacent to said receptacle, one face of said head lying contiguous to the adjacent one of said rotary members and the other face lying contiguous to the adjacent end of said valve member; spacer members on the adjacent faces of said rotary members, the spacer members on one face being adapted to facewise contact the opposite spacer members during equal rotational movements of said rotary members, thereby to maintain same laterally spaced, and said spacer members on each face being adapted to circumferentially contact the spacer members on the other face upon unequal rotational movements of said rotary members to enable decrease of said lateral spacing, thereby to respectively effect inward and outward positioning of said head relatively to said valve, thereby to respectively clear said outlet-inlet port while closing said outlet port during equal rotational movements of said rotary members, and to automatically close said outlet-inlet port and open said outlet port upon unequal rotational movements of siad rotary members.

13. A fluid-flow control mechanism, including: a fluid receptacle interposed in the path of said fluid and including an inlet in the one end for continuously inletting said fluid therethrough; a combined outlet-inlet port disposed intermediate the ends of said receptacle; an outlet port in said receptacle adjacent said outlet-inlet port; a piston-valve member slidably mounted coaxially of said receptacle and having a head adapted to cooperate with alternate ones of said ports to alternately direct the passage of said fluid to and from a point of application, said valve being continuously subjected at the end adjacent said inlet end to pressure from said fluid path; a shaft coaxially slidably mounted at the opposite end of said receptacle; pulleys mounted coaxially of said shaft for relative movement coaxially of each other and lying in operative juxtaposition to the opposite end of said receptacle; followback cable-loops operatively associated at one terminal with a source of movement thereof and at the other terminal individually rove around said pulleys; a head on the end of said shaft adjacent said receptacle, one face of said head lying contiguous to the adjacent one of said pulleys and the other face lying contiguous to the adjacent end of said valve member; circumferentially spaced arcuate protuberances disposed on each of the adjacent faces of said pulleys so as to define alternate lugs and sockets, the lugs on each face being adapted to facewise contact the lugs on the other face during equiangular rotation of said pulleys thereby to maintain same laterally spaced, said lugs on each face being adapted to interfit with and circumferentially contact the lugs on the other face upon unequal rotational movements of said pulleys thereby to juxtaposition said pulleys, whereby to respectively effect inward and outward positioning of said head relatively to the abutting end of said valve, so as to respectively clear said outlet-inlet port while closing said outlet port during equal rotational movements of said pulleys, and to automatically close said outlet-inlet port and open said outlet port upon unequal rotational movements of said pulleys.

14. An automatic fluid-flow controlling mechanism, including: a fluid receptacle interposed in the path of said fluid and including an inlet in the one end for continuously inletting said fluid thereinto; an outlet-inlet port intermediate the ends of said casing; an outlet port in said receptacle adjacent said outlet-inlet port; a multi-headed piston-valve, having its outer end continuously loaded by said controlling fluid, mounted coaxially of said receptacle and having a head adapted to alternately cooperate with alternte ones of said ports for alternately directly the passage of said fluid through said ports; a shaft coaxially slidably mounted at the opposite end of said receptacle and having a head adjacent thereto with one face contiguous to the adjacent one of said rotary members and the other face contiguous to the adjacent end of said valve member; pulleys mounted coaxially of said shaft and capable of relative coaxial movement and lying in operative juxtaposition to the opposite end of said receptacle; followback cables associated at one terminal with rotation-imparting sources and operatively engaging said pulleys at their other terminals; spacer-members on the adjacent faces of said pulleys adapted to normally facewise contact the opposite members during equal angular movements of said pulleys to thereby maintain said pulleys laterally spaced, and adapted to circumferentially contact the opposite members upon unequal angular movements of said pulleys so as to enable decrease of said lateral spacing upon dephasing of said pulleys, thereby to respectively effect relative outward and inward positioning of said movable shaft with respect to said abutted valve, whereby to shift said valve so as to effect forwarding of the fluid-flow out through said outlet-inlet port to a point of application during equal rotational movements of said pulleys and to automatically enable reversal of the fluid-flow from said point into said outlet-inlet port and direct it through said outlet port upon unequal rotational movements of said pulleys.

15. Means for actuating a fluid-flow controlling device of the type that includes a casing having its outer end continuously communicating with a fluid pressure source, and outlet-inlet port for directing said fluid to and from a point of application, an outlet port for directing returned fluid away from the casing, and a piston valve mounted coaxially of the casing and continuously fluid loaded at the end adjacent said casing end by said fluid pressure, comprising: supporting means contiguous to the opposite end of said casing and including an axially movable shaft; a pair of rotary members coaxially slidably mounted on said shaft so as to permit relative axial movement thereof, one such member lying adjacent said casing end; a head on the end of said shaft adjacent said casing end, one surface of said head abutting the outer face of the last said rotary member and the opposite surface of said head abutting the adjacent end of said piston valve; normally facewise contacting spacer members on the adjacent faces of said rotary members maintaining same laterally spaced during equal rotational movements thereof, so as to dispose said shaft outwardly relatively to the casing and thereby dispose said piston valve in outlet-flow permitting position, for normally connecting said fluid pressure source to said outlet-inlet port, said spacer members being adapted for circumferential contact upon unequal rotational movements of said rotary members to enable juxtaposition of said rotary members to dispose said valve in the casing in a position flow-connecting said outlet-inlet port to said outlet port; and force transmitting means engaging the peripheries of said rotary members for imparting equal and unequal angular movements thereto.

16. A braking system for simultaneously halting the movement of a plurality of normally synchronously moving elements upon desynchronization thereof, comprising: a plurality of independently movable elements mounted for synchronous movement; driving means therefor including power transmission means drivingly connected to each element in a parallel power transmission arrangement, thereby to transmit power to each of said elements independently of the other while normally moving said elements synchronously; normally ineffective braking means disposed in operative adjacency to a portion of said power-transmission means; means forming an energy flow-and-return path connected at its working end to said braking means; energy flow-and-return controlling means including means movable into positions relatively to said path that alternately direct energy to said braking means and away from said means, thereby respectively de-activating and activating said braking means; and a plurality of movable means each drivenly connected to one of said independently movable elements and disposed together adjacent said controlling means; at least one of said movable means being operatively connected to said controlling means; said movable means being mutually conformed for mutually widely spaced engagement in close general juxtaposition to said controlling means during synchronous movements of said independently movable elements and of said movable means to retain said controlling means in de-activating condition, thereby to render said braking means ineffective; said movable means being mutually conformed for mutually closely spaced engagement generally away from said controlling means upon de-synchronization of said independently movable elements and of said movable means to release said controlling means for adjustment to its activating condition, thereby to render said braking means effective.

17. A system for arresting, upon desynchronization, the movement of connected objects normally synchronously moved by prime mover means having a power output instrumentality, comprising: braking means disposed around the power output instrumentality of the prime mover and effective to immobilize said power output instrumentality and the object-connecting means; normally active fluid-energy braking-control means having a flow-path leading to said braking means for normally maintaining the brake ineffective when the control-means is in the flow-to-braking means position; a movable element connected to each of said movable objects, said movable elements being operatively mutually associated and operatively axially juxtaposed to said control means; and spacing means, for axially spacing said movable elements from each other, disposed in circumferentially spaced relationship on the adjacent faces of said movable elements and projecting axially thereof and normally endwise mutually abutting during equal rates of movement of said movable elements and thereby positioning said mutually associated movable elements in an axial position relative to said braking control means which maintains said fluid-energy braking-control means active on the braking means and maintains the braking means in an "off" condition; said spacing means mutually interfitting longitudinally and circumferentially of said movable elements and enabling axial juxtaposition of said movable elements upon unequal rates of movement of the latter elements whereby to de-activate said fluid-energy brake control means and enable the brake to operate and arrest movement of the de-synchronously moving objects.

18. A system of the type described for arresting, upon desynchronization, the movement of movable objects normally synchronously moved by prime mover means, comprising: a plurality of members each movably connected to a corresponding movable object, each of said plurality of members including means operative at equal rates of movement of said members to axially space each member from the other and said means being operative upon unequal rates of movement of said members to enable juxtaposition of said members; normally inactive, hydraulically biased prime-mover arresting means connected to said prime mover means; a hydraulic pressure supply and return line leading to said arresting means for applying hydraulic pressure to said arresting means and removing hydraulic pressure from said arresting means for controlling same; and hydraulic pressure and exhaust, energy-flow controlling means interposed in said hydraulic line in operative juxtaposition to said movable members and operable by said movable members during axially spaced movement of said members to direct energy through said line to said arresting means to thereby deactivate the latter; said controlling means being operable by said movable members during juxtaposed movement of said members to thereby effect energy withdrawal from said arresting means and effect actuation of said arresting means and stop the prime mover means.

HOWARD J. IDE.

REFERENCES CITED

The following references are of record in the file of this patent:

UNITED STATES PATENTS

| Number | Name | Date |
|---|---|---|
| 1,886,975 | Profitlich | Nov. 8, 1932 |
| 2,026,814 | Caldwell et al. | Jan. 7, 1936 |
| 2,038,147 | Cook et al. | Apr. 21, 1936 |
| 2,082,052 | Frost et al. | June 1, 1937 |
| 2,119,247 | Scott | May 31, 1938 |
| 2,163,731 | Hallot | June 27, 1939 |
| 2,262,329 | McNeil et al. | Nov. 11, 1941 |
| 2,289,241 | Bullock | July 7, 1942 |
| 2,328,258 | Cannon | Aug. 31, 1943 |